Figure 1:
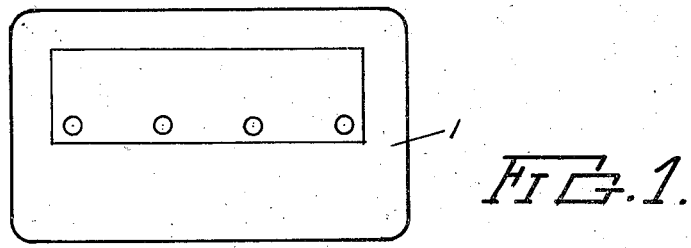

July 23, 1946.   A. ZEMEN   2,404,470

PISTON AND CONNECTING ROD MECHANISM

Filed April 15, 1943

Inventor
ALEXANDER ZEMEN

By Howard J. Whelan.
Attorney

Patented July 23, 1946

2,404,470

UNITED STATES PATENT OFFICE 2,404,470

PISTON AND CONNECTING ROD MECHANISM

Alexander Zemen, Baltimore, Md.

Application April 15, 1943, Serial No. 483,211

1 Claim. (Cl. 74—50)

This invention relates to engines and more particularly to the development of a system of piston and connecting rod mechanisms suitable for straight-line travel and the avoidance of dead center objections. It has among its objects to provide a reciprocating mechanism suitable for piston, crank and connecting rod elements that will secure a straight-line travel of the piston without any tendency to side slap or swinging of the connecting rod. It also has for its object to provide a simplified manner of guiding connecting rods so they will travel in straight lines with the least amount of vibration, and where lubrication can be provided for in definite and predetermined manner. Another object is to provide a head for a connecting rod that will not require a rounded space in the crank case pan to take care of a rotating crank as it travels on the crank shaft, but to eliminate such construction by avoiding the use of a connecting rod head that has a rotative action.

Other objects will become apparent as the invention is more fully set forth.

The conventional type of engine using the reciprocating principle requires a swinging connecting rod, with a hinged connection to the piston itself and a crank that swings around in the crank case. In this invention, the connecting rod travels in a straight line and avoids the use of a hinged joint at the piston connection. These parts usually swing in a lateral plane as they travel, and are substituted by parts that move in one plane without sidewise oscillation. This provides for less distortion wear on the piston cylinder walls and makes the stroke even and smoother. Lubrication can be arranged for same more easily as the oil can be brought directly to the piston without requiring a banjo connection so commonly required. The connecting rod head is restricted to a straight-line movement and avoids the use of a swinging head splashing through the crank case and requiring substantial lateral room to operate in.

Figures 2, 3:
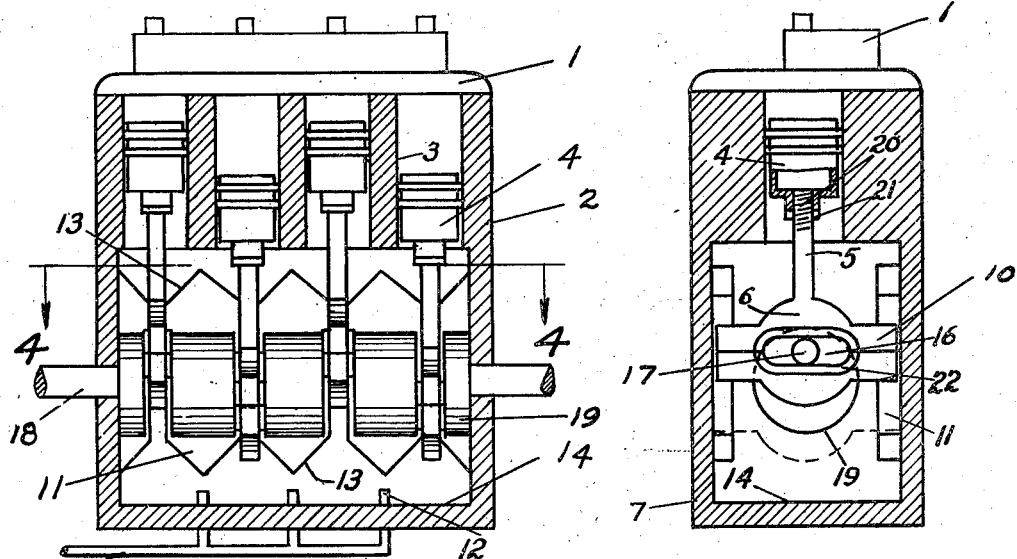
Figure 4:
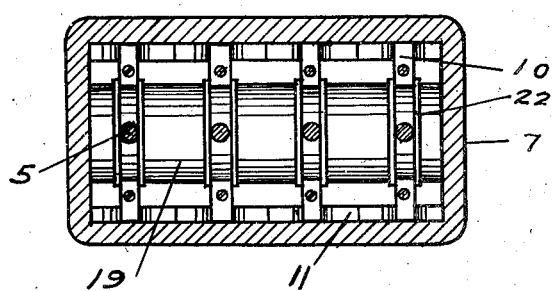

In the drawing, which illustrates an example of a device exemplifying this invention:

Figure 1 is a plan view of a device embodying the invention; Figure 2 is a side elevation of the device partly in section; Figure 3 is an end elevation of the device partly in section, and Figure 4 is a sectional view taken along the line 4—4 of Figure 2.

Similar reference characters refer to similar parts throughout the drawing.

In the drawing, 1 represents the head of a reciprocating engine 2 having cylinders 3 in which travel the pistons 4. The pistons have adjustable extension shafts 5 that connect to flat Scotch yoke members 6 at the flat sides 10 thereof, split and constructed as indicated with screw thread 20 locking nut 21 and bearings 22. These members 6 extend across the crank case 7 so their side surfaces 8 will align closely with the internal wall surfaces 9 of the case 7. These surfaces are suitably polished so the friction and rubbing against each other will be reduced to a minimum. The flat surfaces 10 are guided between strips 11 on the surfaces of the crank case, as indicated. Suitable lubricating devices 12 are arranged for oiling the surfaces of the guides 11. The guides 11 are preferably apexed at 13 to facilitate this action. The oil flows down to the pan 14 of the crank case and reused again in the lubricating system 15. The Scotch yoke members are formed with an oval like opening 16 in which crank pins 17 rotate and operate the members. The pins force the Scotch yoke in a straight-line travel as they rotate. The crank shaft 18 with the crank elements 19 rotate to operate the pins 17 in a usual manner. The elements 19 are enlarged, as indicated, to fit against the sides 10 of the Scotch yoke members and guide the latter between them. This keeps the Scotch yoke properly aligned at all times and prevents any sidewise movement. This affords more assurance for the straight-line travel of the rods during their reciprocation.

The operation of the arrangement seems to be obvious and is therefore not described in detail herein.

While but one form of the invention is shown in the drawing and described herein, it is not intended to limit this application for patent to this particular form, as it is appreciated that other forms of construction could be made that would use the same principles and come within the scope of the appended claim.

Having thus described the invention, what is claimed is:

In a reciprocating engine, the combination of a crank shaft, a crank case, and a cylinder casing combined therewith, piston means inserted in said cylinder casing and operating in a reciprocating manner, piston rods adjustably attached at one end of the piston to form a rigid connection thereto, and arranged to operate in a straight line, a partitioned Scotch yoke member formed at the lower end of the piston rod and reciprocating therewith, guides for said Scotch yoke forming parts of the walls of the crank case, the Scotch yoke being formed in two separate parts and joined together for ready attachment to a crank shaft pin, the Scotch yoke being provided with a symmetrical elongated slot formed at right angles to the center line of the pistons and piston rods, the slot operating the crank shaft as the piston reciprocates in the cylinder, said crank shaft having circular flywheel portions between the crank pins, and said guides having a V shape configuration on both ends to direct lubricating oil to the guiding surface.

ALEXANDER ZEMEN.